United States Patent Office 3,641,227
Patented Feb. 8, 1972

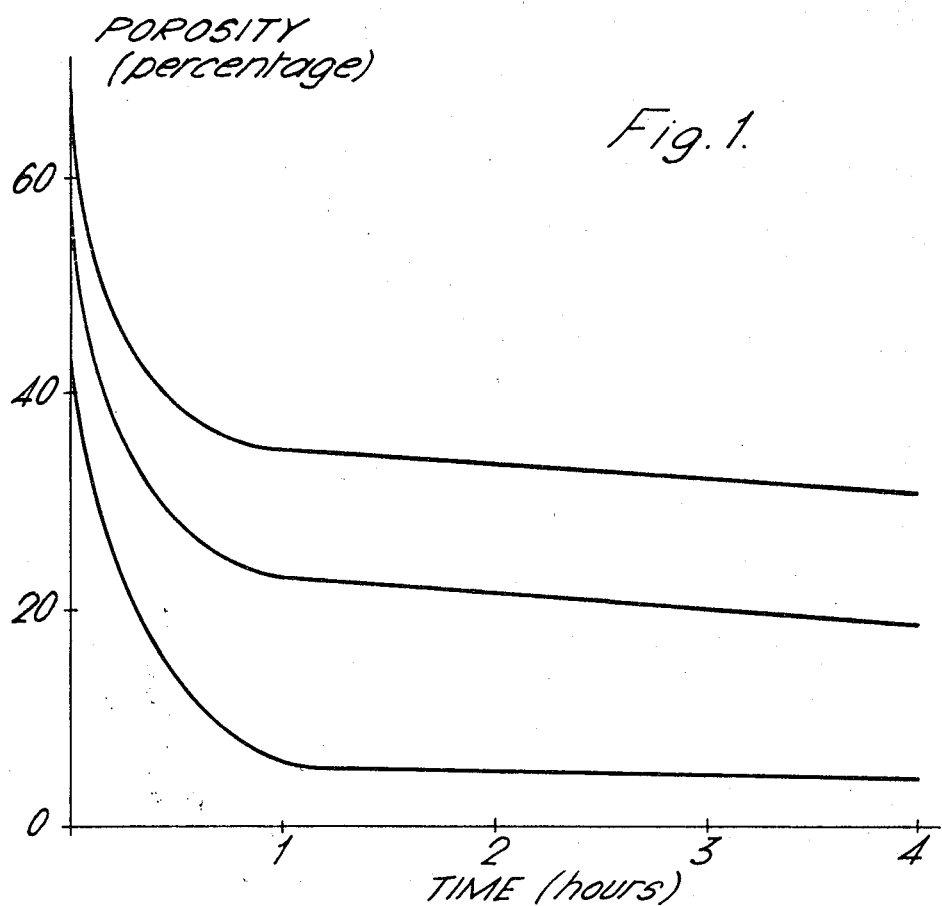

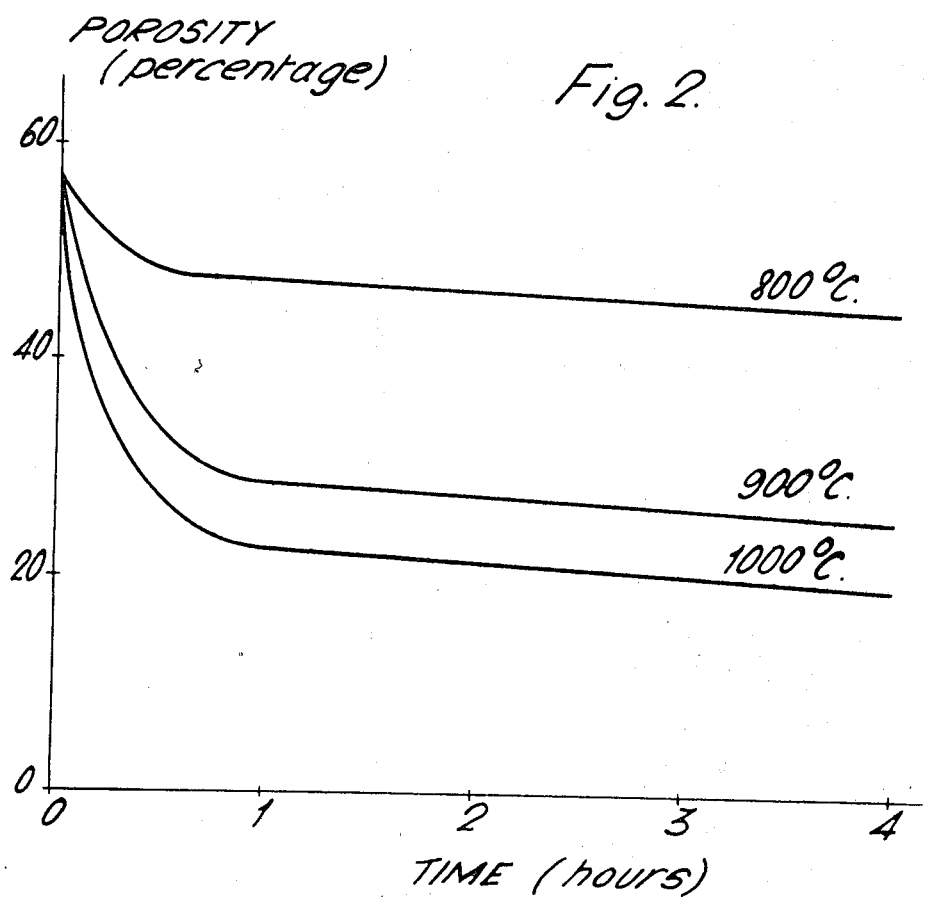

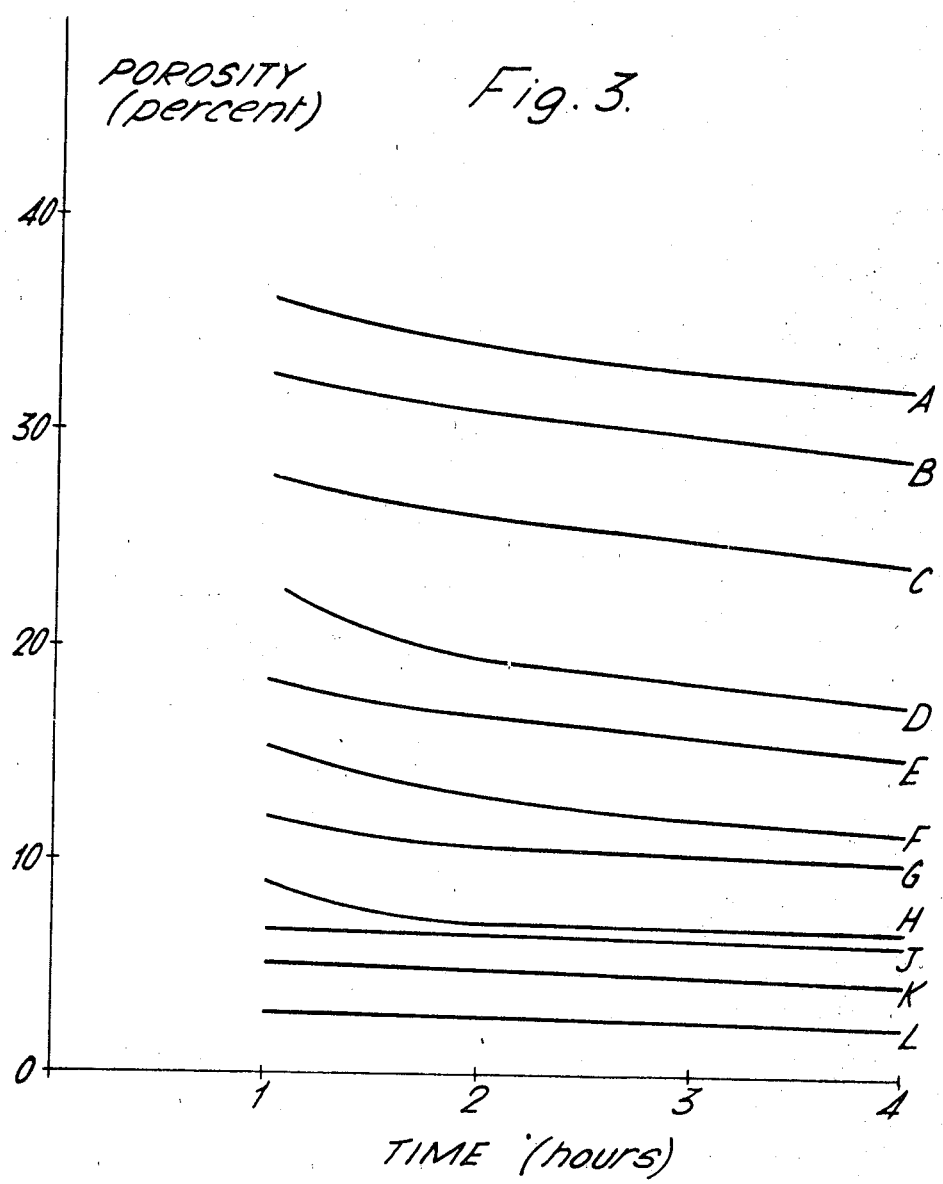

3,641,227
MANUFACTURE OF CERAMIC ARTEFACTS HAVING PORES
Geoffrey Winton Horsley, Wantage, and Ronald-Cyril Burnett, Dorchester, England, assignors to United Kingdom Atomic Energy Authority, London, England
Filed Mar. 28, 1968, Ser. No. 716,729
Claims priority, application Great Britain, Apr. 20, 1967, 18,309/67
Int. Cl. G21c 21/00
U.S. Cl. 264—.5
13 Claims

ABSTRACT OF THE DISCLOSURE

In order to produce porous fuel of controlled voidage, green artefacts, e.g. spheres, are made of $U_3O_8$ or $UC_2$ and sintered until they are dense. They are then heated in a reducing atmosphere to remove oxygen or carbon, as the case may be, and give a porous final artefact of $UO_2$ or $UC$.

BACKGROUND OF THE INVENTION

This invention relates to the manufacture of ceramic artefacts having pores.

It will be known that when nuclear fuel, particularly fuel of high density, is subjected to irradiation by neutrons, it is liable to swell, and if restrained, tends to crack so that it may eventually disintegrate. For this reason, it has been proposed to form nuclear fuel by powder metallurgical methods which will introduce closed pores into the bulk fuel so as to accommodate this swelling to some extent and so produce a more stable product without, it is hoped, excessively reducing the fuel density. As might be expected, the more uniformly the pores can be distributed within the fuel, the more effectively this object is obtained.

In common with analogous arts, the inclusion of closed pores in an artefact of nuclear fuel material is normally accomplished by forming the artefact from ceramic material in which a temporary filler, for example carbon, sawdust or starch has been dispersed, firing the material and subsequently burning out the filler to leave substantially closed pores within the material.

SUMMARY OF THE INVENTION

According to the present invention there is provided a process for forming a porous artefact containing a compound of a multivalent element, such process comprising forming an artefact with the element in a higher valency state and then reducing the valency state by heat treatment and removing a proportion of the non-metallic constituent of the compound to provide pores.

The present invention may be applied, for example, to oxides, carbides, nitrides or silicides of such multivalent metals as uranium, plutonium, titanium, niobium etc. However this specification will describe chiefly the application of the invention to oxides and carbides of the nuclear fuel metal uranium Thus according to a further aspect of the invention, there is provided a process for forming a porous artefact of uranium oxide or carbide, comprising applying a two-stage heat treatment wherein, in the first stage, the oxide or carbide with the uranium in a higher valency state is sintered to densify the artefact but leave it chemically unchanged and, in the second stage, the densified artefact is heated in a reducing atmosphere for such a time as to produce an oxide or carbide with the uranium in a lower valency state by removing a proportion of the oxygen or carbon to provide pores.

Thus the inventive concept can be appraised, in the case of oxide fuel manufacture, by considering an artefact of $U_3O_8$ as a starting material with a theoretical density of 8.39 g./cm.$^3$. The artefact is first sintered at the higher valency in an atmosphere of oxygen to cause the grains to coalesce and to fix the grain boundaries with the result that the artefact is substantially completely densified and yet chemically unchanged. Then, the furnace atmosphere is changed to a reducing one in order to remove some of the bound oxygen, ideally to produce $UO_2$, with a theoretical density of 1095 g./cm.$^3$. Calculation indicates that the depleted artefact would have a porosity of 26%, since the pores in the artefact would be produced by reduction of the non-metallic constituent of the compound. These pores would moreover be distributed with substantial uniformity throughout the artefact.

Similarly, in the case of the manufacture of nuclear fuel carbides, initially the fuel artefact would be formed of $UC_2$ whose theoretical density is 11.68 g./cm.$^3$. This artefact would be densified by heating to a sintering temperature in a carbonizing atmosphere whilst remaining substantially unchanged chemically. Having been densified as $UC_2$, the artefact would then be heat treated in a reducing atmosphere, e.g. hydrogen containing a proportion of methane, to convert the $UC_2$ to $UC$ whose theoretical density is 13.63 g./cm.$^3$. As the volume is fixed this indicates a porosity of 18.2%.

This approach is applicable also to the production of nuclear fuel bodies which include certain mixtures of $PuO_2$ and $UO_2$ or of $PuC$ and $UC$ suggested elsewhere as being suitable for use in fast nuclear reactors in which well distributed porosity is required to permit the fuel to be taken to a high burn-up without difficulty.

BRIEF DESCRIPTION OF THE DRAWINGS

In order that the present invention may more readily be understood, the manufacture of porous uranium dioxide spheres will now be described by way of example and with reference to the accompanying drawings, wherein:

FIG. 1 is a series of graphs showing the effect of the method of preparation on the sintering characteristics of $U_3O_8$ spheres;

FIG. 2 is a series of graphs showing the effect of temperature on the sintering characteristics of $U_3O_8$ spheres; and FIG. 3 is a series of graphs showing the effect of method of production and sintering time on the densities of $UO_2$ spheres.

DESCRIPTION OF THE PREFERRED EMBODIMENT

The porous spheres of this invention, approximately $800\mu$ in diameter, are desirable for use in coated particle fuel manufacture in which each sphere is subsequently coated with layers, e.g. of pyrocarbon and silicon carbide, intended to act as a barrier to fission products generated during operation of the fuel.

The procedure adopted may be summarised as follows:
(a) Preparation of $U_3O_8$ powder
(b) Formation of green $U_3O_8$ spheres
(c) Sintering of $U_3O_8$ spheres
(d) Reduction to $UO_2$ spheres Each of the above steps will be described individually.

PREPARATION OF $U_3O_8$ POWDER

Batches of approximately 400 g. of $UO_2$ were placed in shallow silica trays and heated in air for 30 mins. on a hot plate. The material soon began to oxidise and with the size of batch selected its temperature rose to around 700° C. Each batch was stirred to ensure complete conversion to the higher oxide which was confirmed by its gain in weight.

FORMATION OF GREEN U$_3$O$_8$ SPHERES

The apparatus used was a rubber lined cylindrical closed bowl clamped to a planetary motion machine.

The U$_3$O$_8$ powder produced as above was mixed with n-decanol at the rate of 9–11 cm.$^3$/100 g. U$_3$O$_8$ to produce a damp powder and about 200 g. was loaded into the bowl. After a short period of agitation, seed particles were formed and further powder was added in batches to cause these seeds to grow. After a time the contents of the bowl were sieved to collect the fraction in the size range 1000$\mu$ to 1200$\mu$, the oversize being ground up and fed back with the undersize for further agglomeration.

To remove the decanol, the green spheres were dried in glass dishes on a low hot plate (approximately 150° C.) in a layer one particle thick, this operation taking about 10 mins. To remove higher boiling point impurities still clinging to the spheres, they were then placed in silica dishes and hot plate dried at about 400° C. Failure to remove all the volatiles from the green material can result in the spheres being fractured in the subsequent heat treatment, the more dense green spheres being particularly susceptible to this hazard.

Depending on the technique of using the planetary mill for spheroidisation, the binder concentration and the characteristics of the U$_3$O$_8$ powder, green spheres of different porosities can be obtained. The porosities are generally in the range 43% to 65%.

SINTERING OF U$_3$O$_8$ SPHERES

It will be understood that as green spheres of various densities can be produced, it is possible to produce sintered U$_3$O$_8$ spheres of various densities, depending on the starting material. In addition the precise sintering route will also affect the density. In the preferred route samples of about 10 g. of the dried green spheres were placed in small silica boats and plunged straight into an electric muffle furnace which had been brought to the required temperature. This shock sintering treatment was adopted to obtain the maximum shrinkage in the shortest time and to avoid any complicating effects that could have arisen if the spheres had been slowly heated to the required sintering temperature.

To minimise dissociation of the U$_3$O$_8$ during sintering the maximum temperature employed was restricted to 1000° C. and a slow stream of oxygen was passed over the spheres throughout their heat treatment.

After sintering, the spheres were removed from the furnace, rapidly cooled to room temperature in the atmosphere and their density determined by the mercury pyknometer method.

Samples of U$_3$O$_8$ green spheres of three different porosities, 56%, 64% and 43% were heat treated at 1000° C. for 1, 2 and 4 hours and the resulting porosities are shown in FIG. 1.

In order to demonstrate the effect of temperature on the porosity, samples of dried green U$_3$O$_8$ spheres of 56% initial porosity were heat treated at 800°, 900° and 1000° C. for 1, 2 and 4 hours and the porosities produced by these treatments are shown in FIG. 2, higher temperatures consistently producing lower porosities.

REDUCTION TO UO$_2$ SPHERES

The reduction experiments were carried out in a horizontal graphite tube furnace in which the sintering temperature was restricted to 1600° C. and UO$_2$/C. interaction prevented by carbon monoxide at atmospheric pressure.

Moreover to avoid the possibility of the deposition of carbon within the pores of the U$_3$O$_8$ spheres during the heating up period and to minimise any further sintering of the U$_3$O$_8$ before its reduction to UO$_2$, the furnace was charged with a hydrogen atmosphere at room temperature and this gas was replaced by carbon monoxide at 1000° C.

5 g. samples of U$_3$O$_8$ were placed in an open graphite container, brought to the selected sintering temperature (1600° C.) as quickly as possible (20° C.–1000° C. in 10 mins., 1000°–1600° C. in 15–20 mins.) and heated for periods of 1, 2 and 4 hours. They were subsequently cooled in the furnace to 1000° C. in the carbon monoxide atmosphere which, again to avoid carbon deposition on and in the spheres, was then replaced by helium for the temperature interval 1000° C.–20° C.

The densities of the sintered spheres were determined by the mercury pyknometer method.

Examples of the porosities of UO$_2$ spheres after heat treatments at 1600° C. for 1, 2 and 4 hours, taken from the results of nearly one hundred separate experiments, are shown in FIG. 3. The graphs taken in conjunction with Table 1, show the spectrum of porosities that can be obtained (2–35%) by combining changes in green sphere manufacturing procedure with various heat treatments of the U$_3$O$_8$ in an oxidising atmosphere. They also indicate that porosities suited to the burn-up requirements of the low enrichment cycle can be prepared.

TABLE 1

| Graph | Oxidising treatment | | Porosity, percent | |
|---|---|---|---|---|
| | Time (hours) | Temperature (° C.) | Green spheres | U$_3$O$_8$ spheres |
| A | 1 | 1,000 | 64 | 35 |
| B | 4 | 1,000 | 64 | 31 |
| C | 1 | 800 | 56 | 44 |
| D | 4 | 1,000 | 56 | 20 |
| E | 2 | 800 | 56 | 43 |
| F | 4 | 900 | 56 | 23 |
| G | 0.5 | 800 | 43 | |
| H | None | | 56 | |
| J | None | | 56 | |
| K | 4 | 800 | 56 | 42 |
| L | 4 | 800 | 56 | 42 |

It should be made clear that the step of sintering in an oxidising atmosphere is optional, and, as shown by graphs H and J, may be omitted.

Thus it will be seen that UO$_2$ artefacts can be made with a very wide range of stable porosities (with the pores uniformly distributed) the porosity being controllable by varying:

(1) The method of preparing the U$_3$O$_8$ powder;

(2) The heat treatment (time/temperature) of the U$_3$O$_8$ artefact in oxygen; and (3) The heat treatment (time/temperature) of the U$_3$O$_8$ artefact in a reducing atmosphere.

Moreover, the porosities achieved by this combination of heat treatments are very stable ones. This is clearly demonstrated by FIG. 3. Metallographic examinations of the fuel spheres prepared by this route has shown that the porosity is extremely fine and evenly distributed.

Although in the above embodiment the maximum temperature used in the oxidising stage was 1000° C., it is possible to exceed this figure. For example, a temperature up to 1600° C., as used in the reduction stage, may be advantageous in certain cases.

We claim:

1. A process for producing porosity in an artefact of a compound selected from the group consisting of oxides and carbides of a metal which exhibits multivalency, said process comprising the steps of:

heating a green artefact in an atmosphere selected, respectively, from the group consisting of oxidizing and carbonizing atmospheres with substantially all of said metal in a higher valency state to densify the artefact without lowering the valency of said metal; and heating the densified artefact in a reducing atmosphere for a time sufficient to increase porosity in said artefact by lowering the valency of said metal and by removing oxygen or carbon from the component to provide pores in said artefact.

2. A process according to claim 1 wherein said metal is a nuclear fuel metal.

3. A process according to claim 2 wherein said metal is uranium.

4. A process according to claim 1 wherein said compound is $U_3O_8$ and wherein the green artefact is densified by heating in an oxidizing atmosphere.

5. A process according to claim 1 wherein said compound is $UC_2$ and wherein the artefact is densified by heating in a carbonizing atmosphere.

6. A process according to claim 1 wherein said artefact is a sphere produced by gyrating $U_3O_8$ particles with an organic binder.

7. A process according to claim 6 wherein the spheres have a diameter of from about 1000 to about 1200 microns.

8. A process according to claim 6 wherein said green spheres have a porosity of from 43 to 65%.

9. A process according to claim 1 wherein said artefact includes plutonium oxide or carbide.

10. A process according to claim 3 wherein the green artefact is densified by heating at a temperature of from 800 to 1000° C. for a period of from 1 to 4 hours.

11. A process according to claim 3 wherein the densified artefact is reduced at a temperature of about 1600° C. for a period of from 1 to 4 hours.

12. A process according to claim 4 wherein the reducing atmosphere is carbon monoxide.

13. A process according to claim 1 wherein the porosity of the densified artefacts is determined prior to reducing same and densified artefacts of a pre-determined porosity are selected for reduction.

References Cited

UNITED STATES PATENTS

| | | | |
|---|---|---|---|
| 3,094,377 | 6/1963 | Langrod | 23—355 |
| 3,140,151 | 7/1964 | Foltz et al. | 23—355 |
| 3,194,852 | 7/1965 | Lloyd et al. | 23—355 X |
| 3,278,655 | 8/1966 | Barr | 23—355 X |
| 3,417,167 | 12/1968 | Kizer et al. | 264—.5 |

OTHER REFERENCES

The Chemistry of Uranium, Part I, J. Katz, E. Rabinowitch, McGraw Hill 1951, p. 307.

CARL D. QUARFORTH, Primary Examiner

S. R. HELLMAN, Assistant Examiner

U.S. Cl. X.R.

264—44; 252—301.1 R